Jan. 5, 1943.  F. C. KULIEKE  2,307,320
DRAFT GEAR
Filed Sept. 22, 1941  3 Sheets-Sheet 1

INVENTOR.
Frederick C. Kulieke
BY
Atty.

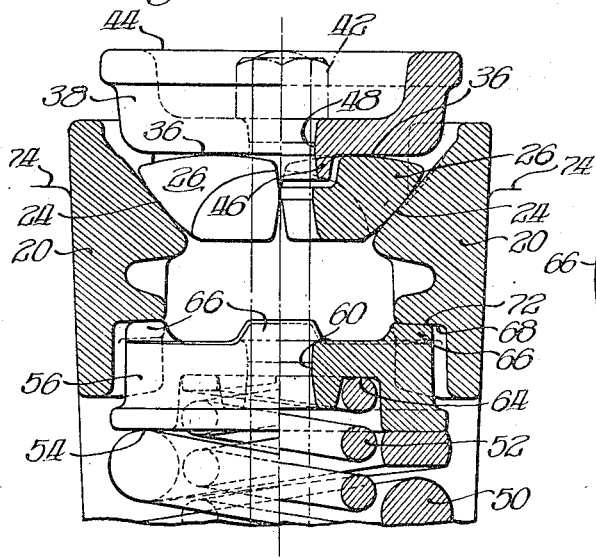
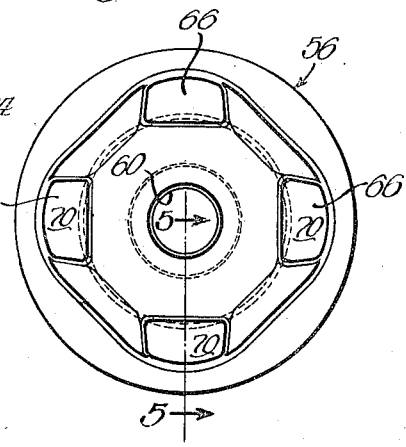
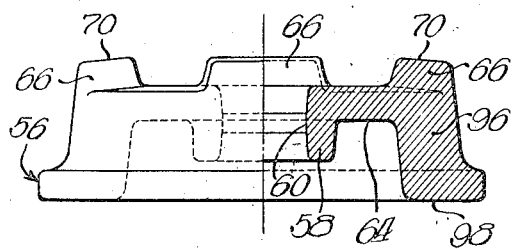
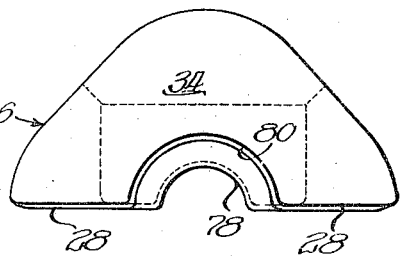
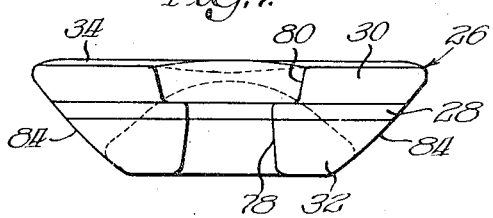
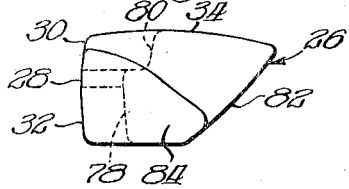

Jan. 5, 1943.   F. C. KULIEKE   2,307,320
DRAFT GEAR
Filed Sept. 22, 1941   3 Sheets-Sheet 3
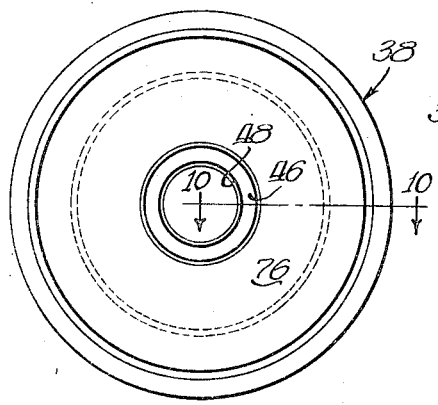
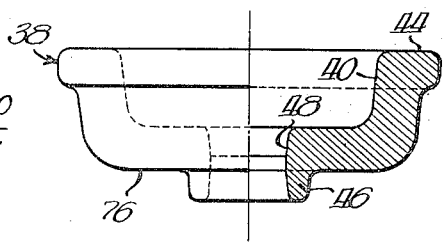
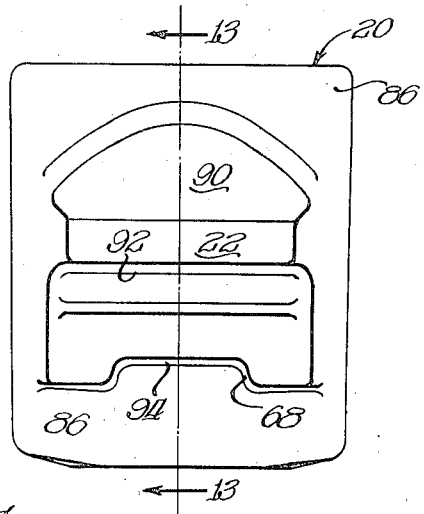
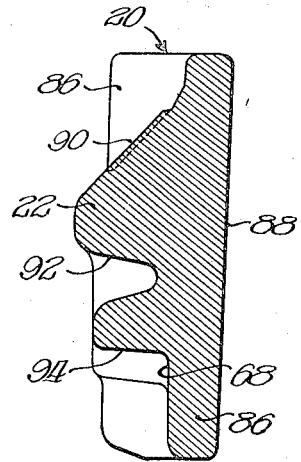
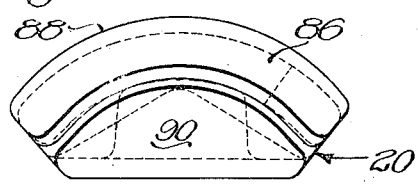
INVENTOR.
Frederick C. Kulieke
BY
Atty.

Patented Jan. 5, 1943

2,307,320

UNITED STATES PATENT OFFICE 2,307,320

DRAFT GEAR

Frederick C. Kulieke, Alliance, Ohio, assignor to American Steel Foundries, Chicago, Ill., a corporation of New Jersey Application September 22, 1941, Serial No. 411,796

23 Claims. (Cl. 213—32)

My invention relates to friction absorbing devices of the type generally designated draft gears and refers particularly to a form of draft gear utilizing a clutch mechanism.

A general object of my invention is to devise a novel form of draft gear utilizing a clutch mechanism wherein a plurality of sets of shoes are symmetrically arranged, and novel equalizing means is utilized for distributing the forces against the respective shoes.

A specific object of my invention is to devise a novel draft gear of clutch type wherein two pairs of shoes may be utilized and a split wedge interposed between the usual follower and the shoes to serve as equalizing means therefor, and cause said shoes to function in a tight condition in view of manufacturing tolerances which might cause loose shoes.

My invention, comprehends an arrangement wherein a plurality of compression springs may be utilized, the spring cap therefor having diagonal face engagement with and interlocking with each shoe.

My novel draft gear comprehends an arrangement in which a two piece wedge insert may be interposed between the follower and the friction shoes, each piece of said insert having diagonal face engagement with said shoes of each set, the shoes being arranged in pairs along axes substantially at right angles to each other.

In the drawings, Figure 1 is an end view of a draft gear embodying my invention with the follower member removed to show the wedge members.

Figure 3 is a further sectional view through the gear illustrated in Figures 1 and 2, the section being taken in the longitudinal plane indicated by the line 3—3 of Figure 1 and substantially at right angles to the view of Figure 2, the housing being omitted and certain parts being shown in elevation.

Figures 4 and 5 show my novel form of spring cap, Figure 4 being a plan view of the outer face thereof, and Figure 5 a side view half in section, the section being taken approximately in the transverse plane indicated by the line 5—5 of Figure 4.

Figures 6, 7, and 8 show my novel form of wedge equalizer, Figure 6 being the plan view from the outer face, Figure 7 a side elevation viewed from the bottom as seen in Figure 6, and Figure 8 an end view taken from the right as seen in Figures 6 and 7.

Figures 9 and 10 show my novel form of follower, Figure 9 being a plan view from the inner face thereof, and Figure 10 a side view half in section, the section being taken substantially in the plane indicated by the line 10—10 of Figure 9.

Figures 11, 12, and 13 show my novel form of friction shoe, Figure 11 being a plan view thereof taken from the radially inner face or center of the gear, Figure 12 an end view taken from the top as seen in Figure 11, and Figure 13 a sectional view in the plane bisecting the shoe longitudinally and substantially as indicated by the line 13—13 of Figure 11.

Figure 1:
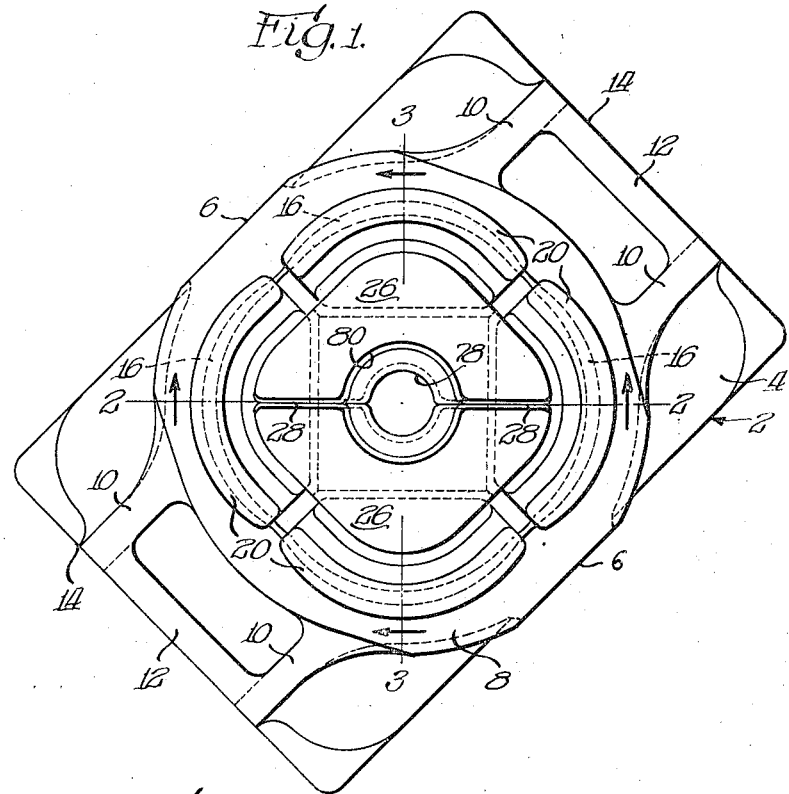
Figure 2:
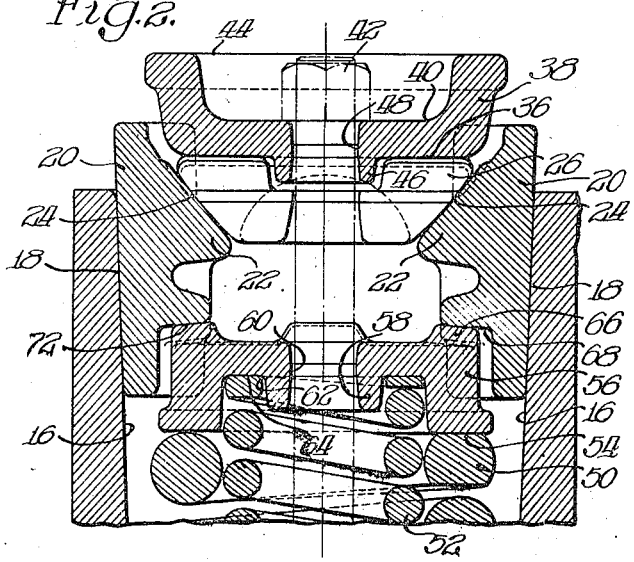
Figure 2 is a sectional view through the structure shown in Figure 1, the section being taken substantially in the longitudinal plane indicated by line 2—2 of Figure 1.

Describing my novel structure in detail, I may utilize a barrel type housing 2 of the well known form having a base 4 generally rectangular in shape, opposite sides of which may be substantially parallel with flattened portions 6, 6 on the barrel 8 to afford seats for said gear; and the edges of the opposite ends of said base may be substantially aligned with longitudinal ribs or flanges 10, 10 with which may merge the webs 12, 12 at the open end of the housing so that the gear may likewise be afforded seats as at 14, 14. The housing is formed with a plurality of friction surfaces 16, 16 symmetrically arranged around the open end thereof, said surfaces affording seats as at 18, 18 for friction shoes 20, 20 which may be arranged in pairs along axes substantially at right angles to each other. The form of each friction shoe is shown in detail in Figures 11 to 13 inclusive, and each shoe comprises a relatively thick shelf-like central portion 22 with a flat diagonally arranged outer surface affording a seat as at 24 for an arcuate face formed on the adjacent wedge equalizer member 26. The equalizer wedge means comprises two identical members 26, 26 which may abut each other on spaced areas along their adjacent edges as at 28, 28 (Figure 1), the surfaces at 28 being formed intermediate the top and bottom edges of their adjacent faces and said adjacent faces being relieved above and below the surfaces 28 as to 30 and 32 (Figure 8) in order to accommodate rocking movement therebetween. Each wedge member 26 is transversely crowned on its top surface 34 (Figure 8) thus affording a seat as at 36 (Figure 2) for the follower 38, the follower having on its outer face a shallow cavity 40 conveniently receiving the threaded end of the securing bolt 42. The annular flange defining the outer edge of the follower 38 may be formed with a flat surface 44 affording a seat for one end of the gear, and on its inner face, said follower may have an annular flange 46 defining in part the bolt opening 48, said flange also serving to position the follower 38 with respect to the wedge equalizer members 26, 26 at opposite sides of the gear.

As shown, the shoes 20, 20 are arranged in opposed pairs along axes substantially at right angles to each other, and each equalizer member 26 is afforded bearing against three of the four shoes, each equalizer member having a central bearing area against one shoe of one set and end bearing areas against the respective shoes of the other set.

Housed within the barrel 8 in usual manner, may be the outer or main compression spring 50 and the inner or auxiliary compression spring 52, said outer spring having a bearing as at 54 against the annular flat surface afforded on the inner face of my novel spring cap 56, said spring cap also having on its inner face the annular flange 58 defining in part the central bolt opening 60, said flange 58 also defining in part an annular recess 62 within which may seat as at 64 the inner auxiliary spring 52. On the outer face of the spring cap 56 and symmetrically arranged about the outer periphery thereof may be raised lugs or bearers 66, 66 (Figure 4), each of which may be recessed in an associated transverse slot 68 centrally formed in the adjacent friction shoe 20. Atop each bearer 66 may be formed a flat diagonally arranged surface 70 which may seat as at 72 against a flat surface formed on the shoe within said slot.

In the sectional view of Figure 3, the housing is omitted but the normal relative position of the housing and the shoes 20, 20 therein is indicated at 74, 74 at opposite sides of said figure. This figure affords an end view of one equalizer wedge member 26 and a transverse sectional view through the other thereof and will illustrate the manner in which the follower 38 is seated as at 36, 36 upon said wedge equalizers 26, 26, the top convex surface of said equalizers permitting rocking movement thereof with respect to said follower. Similarly this view illustrates the manner in which said wedge equalizers may have rocking movement with respect to the shoes 20, 20 against which each may seat as at 24, 24. In the left half thereof, the spring cap 56 may be viewed in elevation.

The follower 38 is shown in detail in Figures 9 and 10, said follower being a cup-like structure circular in plan having on its outer face the flat annular surface 44 defining a seat for one end of the gear as already described and also presenting on its outer face the before-mentioned shallow cavity 40. On its inner face said follower presents an annular flange 46 about the central bolt opening 48 and radially outwardly of said flange affords a flat annular surface 76 against which my novel wedge equalizers may rockingly seat as already described.

My novel form of wedge equalizer is shown in detail in Figures 6, 7, and 8. On the outer face of said wedge there may be formed an annular channel 80 for reception of the before-mentioned flange 46 on the inner face of the follower. On the inner face of each wedge equalizer may be formed an arcuate central bearing area 82 and at opposite ends thereof end bearing areas 84, 84, each central bearing area 82 being designed to fit against a shoe of one pair and the end bearing areas 84, 84 to fit against the respective shoes of the other pair. The convexity of the surfaces 82 and 84 is principally in a single direction in order to facilitate the rocking motion of the wedge equalizer members as already mentioned.

My novel friction shoe is shown in detail in Figures 11, 12, and 13. Each shoe has an arcuate back wall 86 with an outer friction surface 88 having a taper complementary to that of the friction faces on the housing and each shoe is formed with a thickened shelf-like central portion 22 on the outer face of which may be formed a flat surface 90 for abutment with an arcuate surface on the adjacent wedge equalizer centrally of the shelf portion 22. Each shoe may be cored out or relieved as at 92 to reduce weight thereof and the bottom edge of the shelf portion may be slotted as at 68 as already described and formed with a diagonally arranged flat surface 94 for abutment with a positioning lug or bearer on the spring cap as already described.

The spring cap 56 is shown in detail in Figures 4 and 5, said spring cap being substantially circular in plan and having on its upper or outer face the symmetrically arranged bearers or lugs 66, 66 already referred to, said lugs presenting on their upper surfaces diagonally arranged flat faces, said spring cap having the central bolt opening 60.

On the opposite or inner face of said spring cap is an outer annular flange 96 afforded a flat face as at 98 for abutment with the outer compression spring as already described, and said cap may have also the annular flange 58 surrounding the bolt opening 60, said spaced flanges defining an annular channel centrally of said cap affording a seat as at 64 and positioning means for the auxiliary spring 52.

From the above description, it will be apparent that by my novel arrangement, the forces resulting from blows upon the follower will be delivered through the equalizing wedge members to the shoes, the arcuate surfaces on said equalizer wedges permitting such rocking action as will enable the shoes to assume a tight fit against the housing. By this means, substantially equal friction will be developed by all of the friction shoes and the pressures will be equally distributed around the housing thus resulting in an efficient clutch mechanism. At the same time, it will readily be understood that the rocking action of the equalizer wedge members against each other and against the shoes between which they are fitted is such that upon release of pressure from the follower the equalizing unit formed by said wedge members will readily relieve the pressure against the shoes thus permitting free release.

It will be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a draft gear of clutch type, a housing having an open end with tapering friction faces, pairs of friction shoes seated thereagainst, a follower, equalizing wedge means interposed between said follower and said shoes, a plurality of compression springs, a spring cap between said springs and said shoes, said spring cap being seated on said springs and having diagonal face engagement with all of said shoes, interlocking means on said shoes and said cap restricting relative rotational movement thereof, said equalizing wedge means comprising a plurality of wedge members at opposite sides of said gear, each of said members having rocking engagement with said follower and arcuate face engagement with one shoe of one set and with both shoes of the other set, and said members being afforded fulcruming action against each other substantially for the length thereof along abutting faces.

2. In a draft gear of clutch type, a housing having an open end with tapering friction faces, pairs of friction shoes seated thereagainst, a follower, equalizing wedge means interposed between said follower and said shoes, a plurality of compression springs, a spring cap between said springs and said shoes, said spring cap being seated on said springs and having diagonal face engagement with all of said shoes, interlocking means on said shoes and said cap restricting relative rotational movement thereof, said equalizing wedge means comprising a plurality of wedge members at opposite sides of said gear, each of said members having rocking engagement with said follower and arcuate face engagement with one shoe of one set and with both shoes of the other set, and said members having fulcruming action against each other intermediate their inner and outer faces.

3. In a draft gear of clutch type, a housing having an open end with tapering friction faces, pairs of friction shoes seated thereagainst, a follower, equalizing wedge means interposed between said follower and said shoes, a plurality of compression springs, a spring cap between said springs and said shoes, said spring cap being seated on said springs and having diagonal face engagement with all of said shoes, and interlocking means on said shoes and said cap restricting relative rotational movement thereof, said equalizing wedge means comprising a plurality of wedge members at opposite sides of said gear, each of said members having rocking engagement with said follower and arcuate face engagement with one shoe of one set and with both shoes of the other set.

4. In a draft gear of the clutch type, a barrel having an open end with friction surfaces symmetrically arranged therearound, pairs of friction shoes seated against said surfaces with the shoes of respective sets arranged along axes substantially at right angles to each other, a compression spring, a spring cap interlocked with the respective shoes and in diagonal face engagement therewith, a follower, equalizer means interposed between said follower and said shoes, said equalizer means comprising similar members at opposite sides of said gear, each of said members having an arcuate face in abutment with said follower, and a plurality of arcuate faces in abutment with two shoes of one pair and one shoe of the other pair.

5. In a draft gear, a housing having a friction end with tapering friction surfaces therearound, sets of friction shoes symmetrically arranged against said surfaces, a follower, equalizer means interposed between said follower and said shoes, a compression spring, a spring cap in abutment with said spring and said shoes, said equalizer means comprising wedge-like members at opposite sides of the gear, each of said wedge-like members having arcuate face engagement with the follower and arcuate face engagement with one shoe of one set and with both shoes of the other set, said members fulcruming against each other along abutting faces.

6. In a draft gear, a housing having a friction end with tapering friction faces therearound, sets of friction shoes symmetrically arranged against said faces with the shoes of respective sets seated on axes substantially at right angles to each other, a follower, equalizer means interposed between said follower and said shoes, a compression spring, a spring cap between said spring and said shoes, said equalizer means comprising wedge-like members at opposite sides of the gear, each of said wedge-like members having arcuate face engagement with the follower and arcuate face engagement with one shoe of one set and with both shoes of the other set.

7. In a draft gear of the clutch type, a barrel having an open end with friction surfaces symmetrically arranged therearound, pairs of friction shoes seated against said surfaces with the shoes of respective sets arranged along axes substantially at right angles to each other, a compression spring, a spring cap interlocked with the respective shoes and in diagonal face engagement therewith, a follower, equalizer means interposed between said follower and said shoes, said equalizer means comprising similar members at opposite sides of said gear, each of said members having arcuate face engagement with one shoe of one set and with both shoes of the other set.

8. In a draft gear, a housing having a friction end with tapering friction surfaces therearound, sets of friction shoes symmetrically arranged against said surfaces with the shoes of respective sets seated on axes substantially at right angles to each other, a follower, equalizer means interposed between said follower and said shoes, a compression spring, and a spring cap between said spring and said shoes, said equalizer means comprising a wedge-like member at each side of said gear in rocking engagement with said follower and with one shoe of one set and with both shoes of the other set.

9. In a draft gear, a housing having an open end with tapering friction faces, two pairs of friction shoes seated against said faces, a compression spring, a spring cap interlocked with said shoes, a follower, and equalizing wedge means interposed between said shoes and follower with the ends of said wedge means engaging the shoes of one set and intermediate points thereof engaging respective shoes of the other set, portions of said wedge means being capable of relative rocking movement to afford a tight fit for all of said shoes and compensate for manufacturing tolerances.

10. In a draft gear, a housing having a friction end with tapering friction surfaces therearound, sets of friction shoes symmetrically arranged against said surfaces, a follower, equalizer means interposed between said follower and said shoes, a compression spring, and a spring cap between said spring and said shoes, said equalizer means comprising wedge-like members at opposite sides of said gear each in rocking engagement with said follower and with a plurality of shoes of one set and a single shoe of another set.

11. In a draft gear, a housing having an open end with tapering friction faces, two pairs of friction shoes seated against said faces, a compression spring, a spring cap thereon, said spring cap being interlocked with said shoes and having diagonal face engagement therewith, a follower, and equalizing wedge means interposed between said shoes and said follower, said equalizing wedge means comprising a plurality of members and each of said members having rocking engagement with three of said shoes.

12. In a draft gear of the clutch type, a barrel having an open end with friction surfaces symmetrically arranged therearound, two pairs of friction shoes seated against said surfaces, a compression spring, a spring cap interlocked with the respective shoes and in diagonal face engagement therewith, a follower, equalizer means interposed between said follower and said shoes, said equalizer means comprising members at opposite sides of said gear, each having arcuate face engagement with three of said shoes.

13. In a draft gear of clutch type, a housing having an open end with tapering friction faces, two pairs of friction shoes seated thereagainst, a follower, equalizing wedge means interposed between said follower and said shoes, a plurality of compression springs, and a spring cap between said springs and said shoes, said spring cap affording seats for said springs in spaced planes and having interlocking engagement with all of said shoes, said wedge means comprising two members each having abutment with three of said shoes.

14. In a draft gear of the clutch type, a barrel having an open end with friction surfaces symmetrically arranged therearound, two pairs of friction shoes seated against said surfaces, a compression spring, a spring cap interlocked with the respective shoes and in diagonal face engagement therewith, a follower, and equalizer means interposed between said follower and said shoes and comprising two wedge members each abutting two shoes of one pair and one shoe of the other pair.

15. In a draft gear, a housing having a friction end with tapering friction surfaces therearound, two sets of friction shoes symmetrically arranged against said surfaces, a follower, equalizer means interposed between said follower and said shoes, a compression spring, and a spring cap between said spring and said shoes, said spring cap having diagonal face engagement with each of said shoes, said means including two wedge members each bearing against three of said shoes.

16. In a draft gear of clutch type, a housing having an open end with tapering friction faces, two pairs of friction shoes seated thereagainst, a follower, equalizing wedge means interposed between said follower and said shoes, a plurality of compression springs, and a spring cap between said springs and said shoes, said spring cap being seated on said springs and having diagonal face engagement with certain of said shoes, said means comprising a member at each side of said gear abutting three of said shoes.

17. In a draft gear, a housing having an open end with tapering friction faces, two pairs of friction shoes seated against said faces, a compression spring, a spring cap interlocked with said shoes, a follower, and two wedge means interposed between said shoes and said follower, each of said wedge means bearing against three of said shoes and being capable of lateral rocking to afford a tight fit of said shoes and compensate for manufacturing tolerances.

18. In a draft gear, a housing having an open end with tapering friction faces, two pairs of friction shoes seated against said faces, a compression spring, a spring cap interlocked with said shoes, a follower, and two equalizing wedges interposed between said shoes and follower with the ends of said wedges engaging the shoes of one set and intermediate points thereof engaging respective shoes of the other set.

19. In a draft gear, a housing having an open end with tapering friction faces, two pairs of friction shoes seated against said faces, a compression spring, a spring cap thereon, said spring cap being interlocked with said shoes and having diagonal face engagement therewith, a follower, and two wedge means interposed between said shoes and said follower, each of said wedge means having an arcuate bearing against said follower and three of said shoes.

20. In a draft gear, a housing having a friction end with tapering friction surfaces therearound, two sets of friction shoes symmetrically arranged against said surfaces, a follower, two equalizer means interposed between said follower and said shoes, a compression spring, and a spring cap between said spring and said shoes, each of said means being in the form of a wedge member having arcuate bearing against three of said shoes and said follower.

21. A friction absorbing device comprising an open-ended housing, a compression spring therein, a spring cap, four friction shoes seated against said housing in abutment with said cap, a follower, and two equalizing wedge members interposed between said follower and said shoes with each wedge member abutting three of said shoes.

22. A friction absorbing device comprising an open-ended housing, a compression spring therein, a spring cap, four friction shoes seated against said housing in abutment with said cap, a follower, and two equalizing wedge members interposed between said follower and said shoes with each wedge member having arcuate abutment against three of said shoes and against said follower.

23. In a friction absorbing device, a housing having a friction end, a compression spring therein, a spring cap, two pairs of friction shoes, a follower, and two wedge members interposed between said follower and said shoes, each of said wedge members having bearing against three of said shoes, and certain of said bearings being arcuate in form.

FREDERICK C. KULIEKE.